(12) United States Patent
Ueda et al.

(10) Patent No.: US 6,178,155 B1
(45) Date of Patent: Jan. 23, 2001

(54) OPTICAL PICKUP WITH STRUCTURE TO REDUCE VIBRATION

(75) Inventors: Osamu Ueda; Jun Suzuki; Shigeyuki Sasanuma; Shinichi Fujinoki, all of Saitama-ken (JP)

(73) Assignee: Pioneer Electronic Corporation, Tokyo (JP)

( * ) Notice: Under 35 U.S.C. 154(b), the term of this patent shall be extended for 0 days.

(21) Appl. No.: 08/890,984

(22) Filed: Jul. 10, 1997

(30) Foreign Application Priority Data

Jul. 12, 1996 (JP) .................................................. 8-182871

(51) Int. Cl.[7] .................................................. G11B 17/00
(52) U.S. Cl. ........................................... 369/244; 369/247
(58) Field of Search .................................. 369/244, 245, 369/247, 44.32, 44.15, 75.1, 75.2, 77.1, 77.2, 219

(56) References Cited

U.S. PATENT DOCUMENTS

| | | | |
|---|---|---|---|
| 4,773,057 | * 9/1988 | Otsuka et al. ....................... | 369/75.2 |
| 4,829,508 | * 5/1989 | Arita ................................... | 369/215 |
| 5,084,854 | * 1/1992 | Ikedo et al. ......................... | 369/75.1 |
| 5,124,973 | * 6/1992 | Igata ................................... | 369/244 |
| 5,172,361 | * 12/1992 | Urushibata et al. ................ | 369/77.1 |
| 5,703,864 | * 12/1997 | Miyagi et al. ....................... | 369/112 |
| 5,726,968 | * 3/1998 | Blankers ............................. | 369/247 |

FOREIGN PATENT DOCUMENTS 7-114735 * 5/1995 (JP) .

* cited by examiner

Primary Examiner—Brian E. Miller
Assistant Examiner—Kenneth W Fields
(74) Attorney, Agent, or Firm—Morgan, Lewis & Bockius LLP

(57) ABSTRACT

There is provided an optical pickup for use in an information reproducing apparatus for playing an optical disc, said optical pickup comprising: a main pickup body carrying an objective lens; a sub-pickup body pivotably connected with the main pickup body; a connecting structure formed in connection with the main pickup body for pivotably supporting the sub pickup body. A space having a predetermined size is formed between the main pickup body and the connecting structure. The material thickness between the main pickup body and the connecting structure is made thinner by virtue of the formation of said groove.

10 Claims, 7 Drawing Sheets

OPTICAL PICKUP WITH STRUCTURE TO REDUCE VIBRATION

BACKGROUND OF THE INVENTION

The present invention relates to an optical pickup which is indispensable part for an information reproducing apparatus (disc player) for playing a CD (compact disc) and a DVD (digital video disc).

A compact disc (hereinafter referred to as CD) comprises a plastic layer (having a thickness of 1.2 mm) on which audio or video signals are recorded in the form of numerous information pits, a metal reflecting layer formed on the plastic layer, and a protection layer formed on the reflecting layer.

A digital video disc (hereinafter referred to as DVD) comprises two information layers on each of which signals are recorded in the form of numerous information pits, each having a thickness of 0.6 mm. Such a DVD is capable of recording a much larger amount of information than a CD.

Although a CD and a DVD are different from each other in their specifications, a CD drive of a CD player has many similarities with a DVD drive of a DVD player. Thus, there has been suggested an optical disc player which has two optical pickups adapted to play a CD and a DVD, using only a single disc drive.

However, in the optical disc player designed to play a CD and a DVD, since there are two optical pickups, two sets of moving mechanisms are required to respectively move the two optical pickups in disc radial direction. As a result, it is difficult for a disc player to be made compact.

In view of the above, a more compact player has been demanded which has only a single optical pickup capable of playing not only a CD but also a DVD. For instance, the single optical pickup is made into two-focus pickup capable of emitting an optical beam for playing both a CD and a DVD (whose protection layers are different from each other in thickness). However, in a case where a two-focus optical pickup is employed in a disc player, if there is an inclining angle between the recording surface of an optical disc and the optical axis of the optical beam, a comatic aberration will occur in the optical beam when irradiating an optical disc. in order to correct such a comatic aberration, a pickup including an actuator is moved in disc radial direction or disc tangential direction, thereby eliminating the inclining angle between the recording surface of an optical disc and the optical axis of an optical beam.

On the other hand, since an optical beam for DVD and an optical beam for CD are caused to pass through an identical objective lens with different incident angles, an attempt to eliminate a comatic aberration occurring in one optical beam will undesirably promote a comatic aberration occurring in the other optical beam. Namely, it is difficult to eliminate two kinds of comatic aberration occurring in two optical beams.

In order to solve the above problem, at first the pickup body is caused to incline to some extent to eliminate a comatic aberration occurring in one optical beam. Then, the actuator of the pickup body is caused to incline to some extent in a direction in which a comatic aberration occurs in the other optical beam. Further, it is also possible to have the pickup body inclined to at the same time eliminate the above two kinds of comatic aberration occurring in the above two optical beams.

It is understood from the above explanation that, in order to correct two kinds of comatic aberration occurring in two optical beams, it is necessary to establish a construction where the pickup body of the two-focus pickup may be made inclined with respect to the recording surface of an optical disc. For instance, it is required that the pickup body be divided into a main pickup body and a sub-pickup body, both of which are pivotably connected with each other, such that the main pickup body may be made inclined so as to correct the above comatic aberration.

However, in a construction where the main pickup body and a sub-pickup body are pivotably connected with each other, a resonance phenomenon will occur in both the main pickup body and the sub-pickup body due to a vibration from the outside, resulting in a problem that information can only be reproduced with a deteriorated precision.

SUMMARY OF THE INVENTION

It is an object of the present invention to provide an improved optical pickup capable of reproducing information from an optical disc with a high precision even if there is a vibration from the outside, so as to solve the above-mentioned problems peculiar to the above-mentioned prior arts.

According to the present invention, there is provided an optical pickup for use in an information reproducing apparatus for playing an optical disc, said optical pickup comprising: a main pickup body carrying an objective lens; a sub-pickup body pivotably connected with the main pickup body; a connecting structure formed in connection with the main pickup body for pivotably supporting the sub-pickup body. A groove having a predetermined size is formed between the main pickup body and the connecting structure. The material thickness between the main pickup body and the connecting structure is made thinner by virtue of the formation of said groove.

In detail, the above connecting structure is connected to the sub-pickup body through a support portion of the sub pickup body. The support portion of the sub-pickup body is formed with a screw hole into which a screw is engaged. Similarly, the connecting structure is also formed with a screw hole. Thus, a screw engaged in the screw hole of the support portion of the sub-pickup body is engaged into the screw hole of the connecting structure.

The above objects and features of the present invention will become more understood from the following description with reference to the accompanying drawings.

DETAILED DESCRIPTION OF THE PREFERRED EMBODIMENTS

Figure 1:
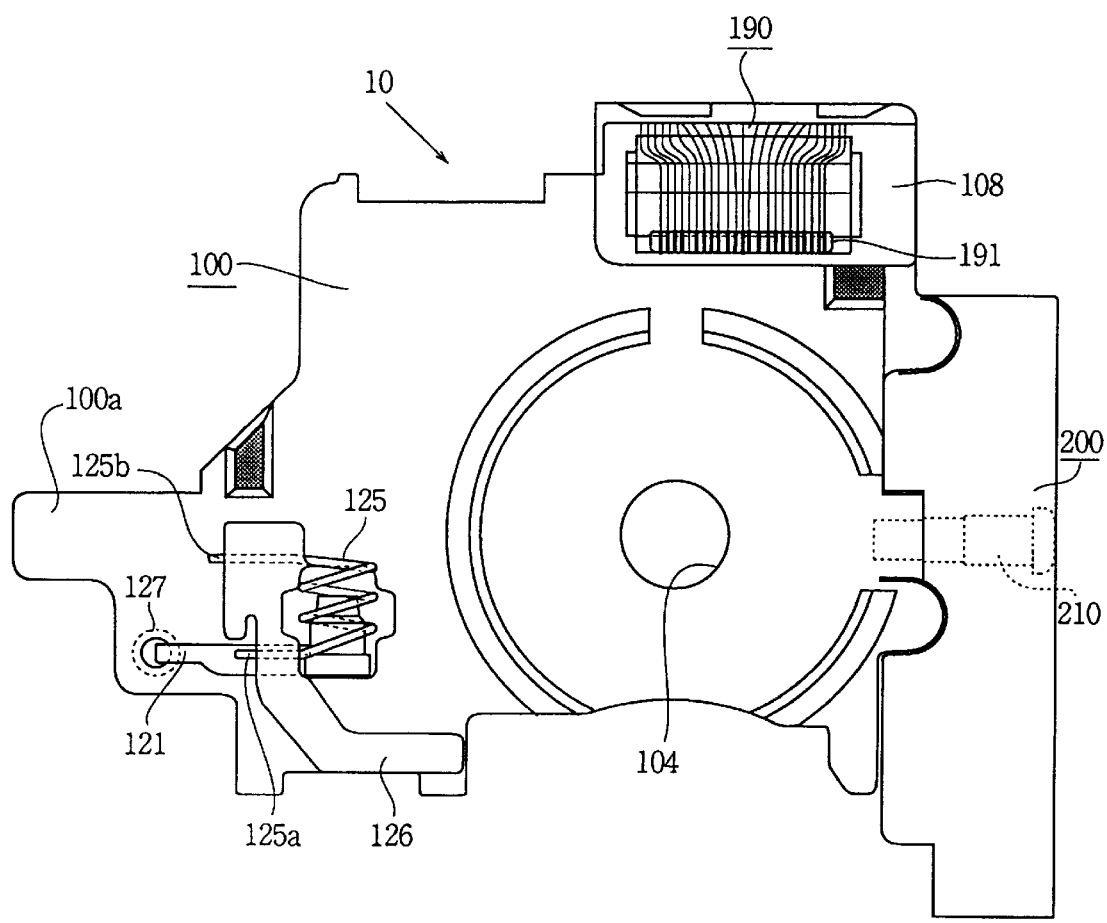
FIG. 1 is a top plane view showing one embodiment of an optical pickup according to the present invention.
Figure 2:
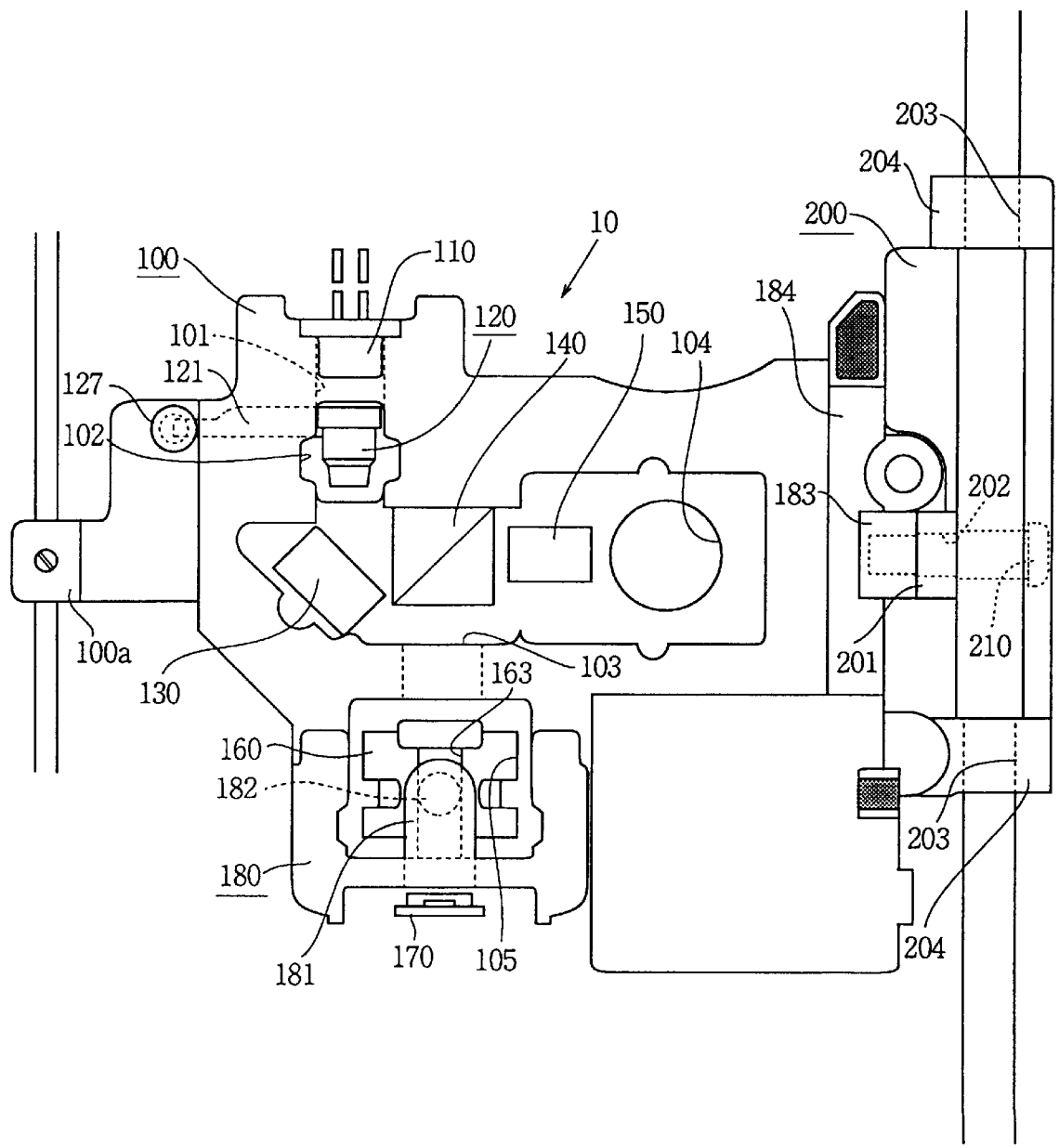
FIG. 2 is a bottom plane view of the optical pickup of FIG. 1.

Referring to FIGS. 1 and 2, an optical pickup of the present invention includes a main pickup body 100 and a sub pickup body 200. On the side face (on the right side in FIGS. 1 and 2) of the sub-pickup body 200, there is provided a rack (not shown) arranged in a vertical direction as viewed in FIGS. 1 and 2. A driving pinion (not shown) is engaged with said rack.

On the other hand, the pickup body 100 has a support portion 100a on which a rod (not shown) is provided in parallel with the above rack. In detail, an urging member having a predetermined elasticity is provided on the underside of the support portion 100a, the above rod is supported on the urging member. Further, a screw hole is formed through the support portion 100a, and an adjusting screw (not shown) is engaged in the said screw hole, such that a frond end of the screw is in contact with the above rod. In this way, the rod may be firmly pressed between the above urging member and the front end of the above adjusting screw. When the main pickup body 100 is moved in a direction that is the rod axis direction, the above urging member and the front end of the above adjusting screw will slid in contact with the above rod, thus the movement of the main pickup body 100 will not be hampered. In this way, the pickup body 100 may be freely moved in the rod axis direction (disc radial direction) by rotating the above driving pinion.

As shown in FIG. 2, a laser diode 110 for emitting an optical beam is mounted in a notch 101 of the main pickup body 100. An optical beam from the laser diode 110 is adjusted in its optical axis by virtue of a grating element 124 (FIG. 3) held on a grating holder 120 which has an optical axis adjusting member 121. The grating holder 120 is attached in another notch 102 which is communicated with the notch 101.

Figure 3:
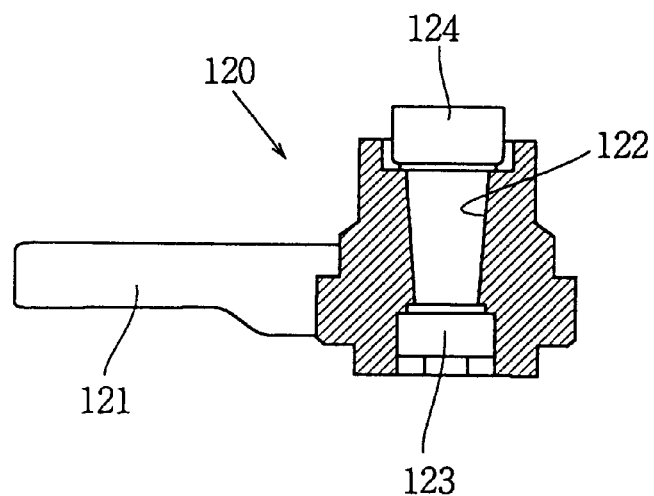
FIG. 3 is a cross sectional view showing a grating holder used in the optical pickup of FIG. 1.
Figure 4:
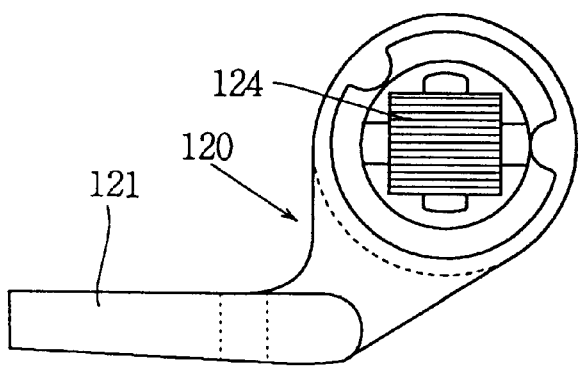
FIG. 4 is a front view showing the grating holder of the FIG. 3.

Referring to FIGS. 3 and 4, the grating holder 120 is formed with a hollow portion 122. A glass plate 123 is provided at one end of the hollow portion 122, a grating element 124 is provided at the other end of the hollow portion 122. The optical beam from the laser diode 110 is received through the glass plate 123 and emitted through the grating element 124.

Further, as shown in FIG. 2, the grating holder 120 is urged in the optical axis direction towards the laser diode 110 by virtue of a coil-like spring 125 (FIG. 1). As shown in FIG. 1, since one end 125b of the coil-like spring 125 is urged by an elastic member 126 towards the main pickup body 100, the other end 125a of the coil-like spring 125 will also be urged towards the main pickup body 100. In this way, the optical axis adjusting member 121 of the grating holder 120 in tight contact with the end 125a will also be urged towards the main pickup body 100. As a result, by virtue of the coil-like spring 125, the grating holder 120 will be urged at the same time towards both the laser diode 110 and the main pickup body 100.

Figure 5:
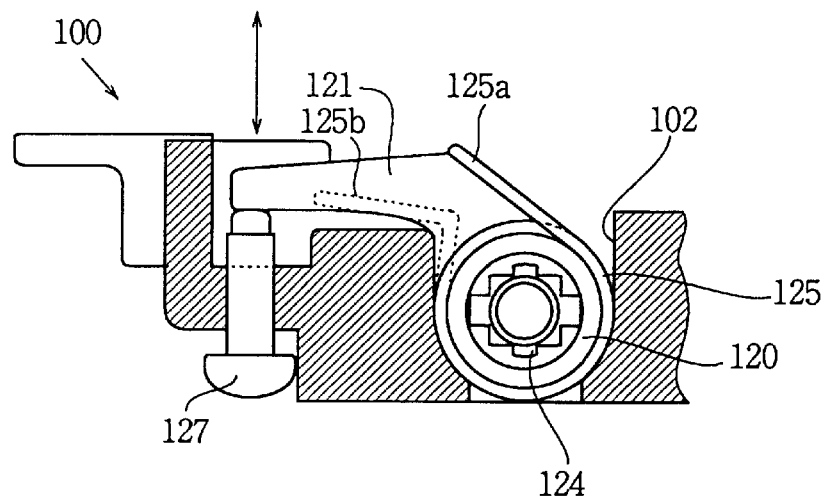
FIG. 5 is a cross sectional view showing the optical axis of the grating holder of FIG. 3.

Referring to FIG. 5, with the use of the above-described construction, when the optical axis of an optical beam from the laser diode 110 is to be adjusted, an adjusting screw 127 screwed upwardly through the main pickup body 100 may be slightly screwed up or down. In this manner, by turning the grating holder 120 using the optical axis adjusting member 121, the diffraction pattern of the grating element 124 may be made inclined so that the diffracting direction is changed. At this moment, the grating holder 120 may be fixed in the inner space 102, by virtue of the upward force of the adjusting screw 127 and the elastic force of the coil-like spring 125.

The optical beam passing through the grating holder 120 is bent at a reflecting mirror 130 (mounted in a notch 103) for 90°, so as to arrive at a prism 140 (mounted in the same notch 103), as shown in FIG. 2.

Further, the optical beam passing through the prism 140 becomes parallel beam upon passing through a collimator lens 150. Then, the parallel beam is bent for another 90° by means of another reflecting mirror (not shown) so as to pass through an objective lens (not shown) provided in a hole 104. Finally, the optical beam passing through the objective lens is converged onto a recording surface of an optical disc.

The returning beam from the recording surface of the optical disc is directed backwardly by way of the objective lens (not shown), the collimator lens 150, the reflecting mirror (not shown) and the prism 140. Then, the returning beam is directed to a photo-detector 170 (FIG. 2) by way of a multi-lens 160A (FIGS. 6 and 7) held by a multi-lens holder 160 (attached in a notch 105 which is communicated with the notch 103.)

Referring again to FIG. 2, the multi-lens holder 160 is elastically held in the notch 105 by virtue of a support portion 181 of an elastic support member 180 (which is secured on the main pickup body 100). Further, a hemispherical projection 182 formed on the support portion 181 of the elastic support member 180 is embedded in a notch 163 of the multi-lens holder 160.

The multi-lens 160A held by the multi-lens holder 160 has a function of cylindrical lens causing astigmatic aberration, and a function of convex lens collecting returning beam from the optical disc onto the photo-detector 170.

Figure 6:
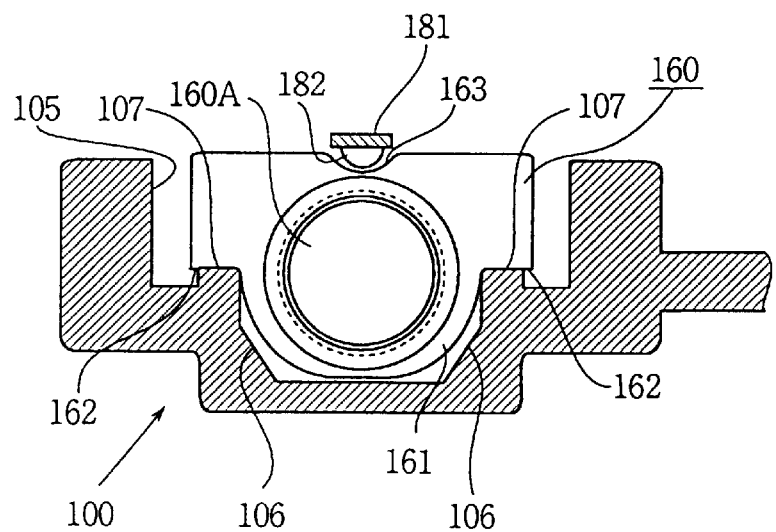
FIG. 6 is a front view showing a multi-lens holder of the optical pickup of FIG. 2.
Figure 7:
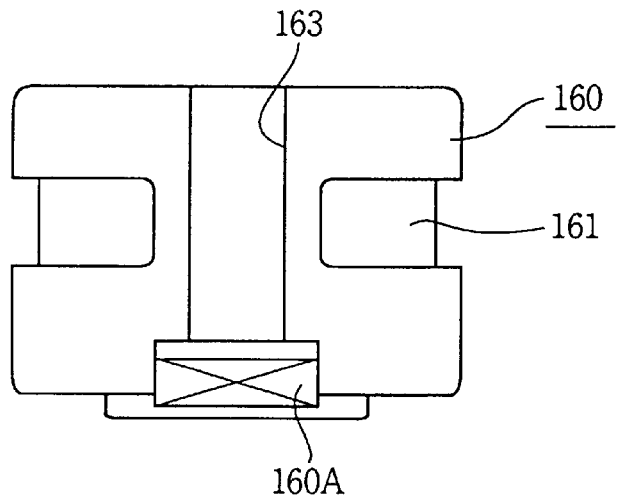
FIG. 7 is a top plane view showing the multi-lens holder of FIG. 6.

Further, as shown in FIGS. 6 and 7, the multi-lens holder 160 has support portions 162, 162 extending in the horizontal direction, and a main body portion 161 formed between the support portions 162, 162. When the multi-lens holder 160 is attached in the notch 105 of the main pickup body 100, the support portions 162, 162 become in contact with support projections 107, 107 of the notch 105, so that the multi-lens holder 160 may be arranged in a predetermined position in the main pickup body 100. In such an arrangement, the body portion 161 of the multi-lens holder 160 will avoid getting contact with the inner wall of the notch 105.

An optimum position of the multi-lens 160A held by the multi-lens holder 160, i.e., a position that allows the photo-detector 170 to obtain a desired amount of reflecting beam, may be adjusted by an adjusting jig 220 (FIG. 8) of an automatic adjusting mechanism.

Figure 8:
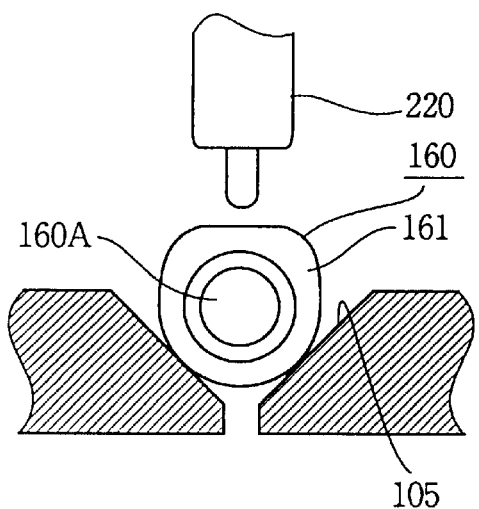
FIG. 8 is an explanatory view showing how to adjust the position of the multi-lens holder of FIG. 6.

Referring to FIG. 8, the adjusting jig 220 of the automatic adjusting mechanism is caused to engage on the upper portion of the multi-lens holder 160, making the multi-lens holder 160 to have a tendency to move in the optical axis direction. At this moment, an acting point of the adjusting jig 220 on the multi-lens holder 160 will be close to the contact surfaces between the support portions (162, 162) and the support projections (107, 107). In this way, even if the adjusting jig 220 has its acting force collected at one point on the upper portion of the multi-lens holder 160, the contact faces between the support portions (162, 162) and the support projections (107, 107) will serve to prevent the multi-lens 160A from falling down in the moving direction of the multilens holder 160, ensuring a smooth movement of the multi-lens holder 160. Therefore, it becomes possible to adjust the multi-lens 160A to its optimum position with a high precision.

As shown in FIG. 6, since the multi-lens holder 160 is urged only by a projection 182 of a support member 181, the multi-lens holder 160 may be freely turned to some extent with the projection 182 as a turning center.

Referring again to FIGS. 1 and 2, since the screw 210 engaged in the screw hole 202 of the support portion 201 of the sub-pickup body 200 is engaged into a screw hole of a connecting structure 183 formed in connection with the main pickup body 100, the main pickup body 100 and the sub-pickup body 200 are connected to be relatively pivotable with respect to each other. Thus, it is seen that the connecting structure 183 is connected to the sub-pickup body 200 through its support portion 201. After the comatic aberration in the two-focus optical pickup has been corrected, the screw 210 may be further fastened, so that the main pickup body 100 and the sub-pickup body 200 may be fixed together.

Figure 9:
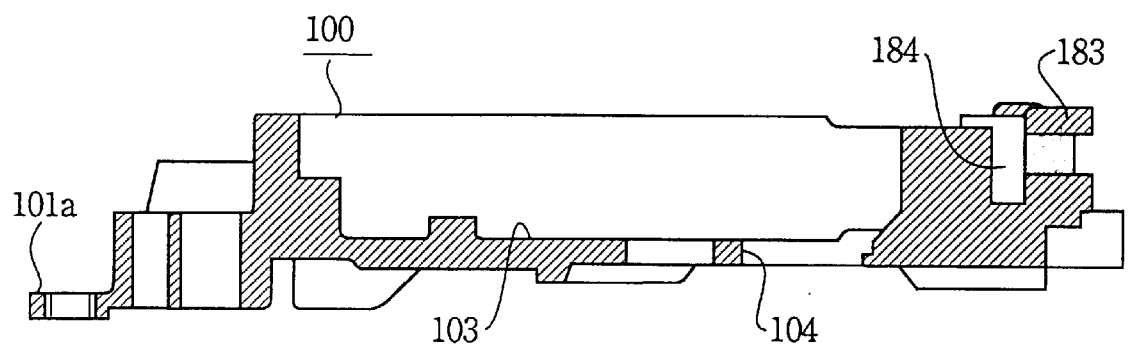
FIG. 9 is a cross sectional view showing a main pickup body of the optical pickup of FIG. 1.

Further, between the connecting structure 183 and the main pickup body 100 there is formed a groove 184 having a predetermined size and depth. As shown in FIG. 9, due to the formation of the groove 184, the material thickness between the main pickup body 100 and the connecting structure 183 may be made thinner, thereby prohibiting or at least reducing a resonance phenomenon between the main pickup body 100 and the sub-pickup body 200 by reducing a vibration transmitting between the two.

Namely, in the optical pickup of the present invention, the rigidity of the connecting structure 183 (for connecting the main pickup body 100 with the sub-pickup body 200) will vary wit h the depth and length of the groove 184. In fact, the resonant frequency of the sub-pickup body 200, which depends upon the mass of the sub-pickup body 200 and the rigidity of the connecting structure 183, may be utilized to determine the shape of the groove 184, such that the resonant frequency of the sub-pickup body 200 will be different from the resonant frequency of the main pickup body 100.

Referring again to FIG. 1, a connector 190 is attached to an attachment section 108 of the main pickup body 100.

Figure 10:
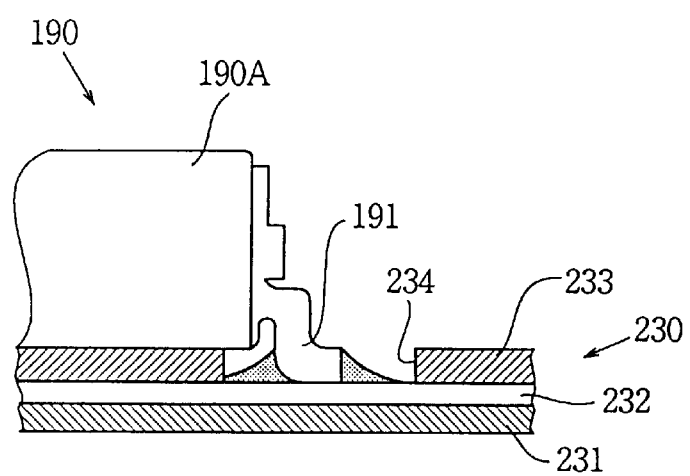
FIG. 10 is an explanatory view showing how terminals of a connector are connected to a print substrate.

In the present embodiment, as shown in FIG. 10, a plurality of terminals 191 formed on the connector 191, are connected by means of solderring to a print substrate 230 provided on the attachment section 108. The print substrate 230 is formed by spreading a layer of copper foil 232 over a base layer 231, followed by bonding a cover layer 233 over the copper foil 232. The cover layer 233 is formed with a plurality of holes 234 which permit the terminals 191 to be embedded into the print substrate 230. Further, a plating layer (not shown) is formed on the copper foil 232 over the areas corresponding to the holes 234.

The main body 190A of the connector 190 is attached on the cover layer 233, so that each terminal 191 is in con tact with the copper foil 232 through the plating layer (not shown).

In this way, all the terminals 191 may be attached to the copper foil 232, facilitating the positioning of the connector 190 onto the print substrate 230. Finally, solderring is performed to permanently connect the terminals 191 to the print substrate 230. The above arrangement of the terminals 191 on the print substrate 230 not only allows an easy solderring operation, but also prevents a problem of solderring bridge occurring between two terminals 191 (even if a pitch of every two terminals is small).

The operation of the optical pickup having a construction as described above will be described in more detail as follows, with reference to FIGS. 1 and 2.

At first, when information recorded on an optical disc is to be reproduced, the pinion engaging with the rack provided on the sub-pickup body 200 is driven so as to apply a driving force to the pickup body 200. At this moment, the main pickup body 100 is guided by the rod (not shown), the support member 204 of the sub-pickup body 200 is guided by a guide shaft (not shown), so that the optical pickup 10 is caused to move in the radial direction of the optical disc.

Then, an optical beam is emitted from the laser diode 110. The optical beam is at first diffracted by the grating element 124 held on the grating holder 120, and is bent at the reflecting mirror 130 for 90° so to arrive at the prism 140.

Further, the optical beam passing through the prism 140 becomes parallel beam through a collimator lens 150. Then, the parallel beam is bent for another 90° by means of another reflecting mirror (not shown) so as to pass through an objective lens (not shown) provided in a hole 104. Finally, the optical beam passing through the objective lens is converged onto the recording surface of an optical disc.

The returning beam from the recording surface of the optical disc is directed backwardly by way of the objective lens (not shown), the collimator lens 150, the reflecting mirror (not shown) and the prism 140. Then, the returning beam is directed to a photo-detector 170 (FIG. 2) through the multi-lens 160A (FIG. 7) held by a multi-lens holder 160 (attached in a notch 105 communicated with the notch 103.)

During the above operation, since there is formed a space 184 between the connecting structure 183 and the main pickup body 100, if there is a vibration from outside, it is possible to prohibit a resonance phenomenon between the main pickup body 100 and the sub-pickup body 200 by reducing a vibration transmitting therebetween, thereby enabling a stabilized information reproduction.

In the embodiment shown in FIGS. 1 and 2, the grating holder 120 is urged by the coil-like spring 125 towards the laser diode 110. Thus, effected by the coil-like spring 125, the grating holder 120 receives not only an urging force to push the grating holder 120 towards the laser diode 110, but also an urging force to cause the grating holder 120 to turn about the optical axis of the grating element 124. There is a possibility that the coil-like spring 125 will deform to some extent due to an upward force produced by the adjusting screw 127. The deformation of the coil-like spring 125 will cause the grating holder 120 to incline a little, resulting in a deviation of optical axis from its correct position. In order to avoid this problem, as shown in FIG. 11, a holding member 125a for holding the grating element 124 is made to have a smaller diameter portion, thus reducing a direct contact between a coil-like spring 125A and the holding member 125a.

Figure 11:
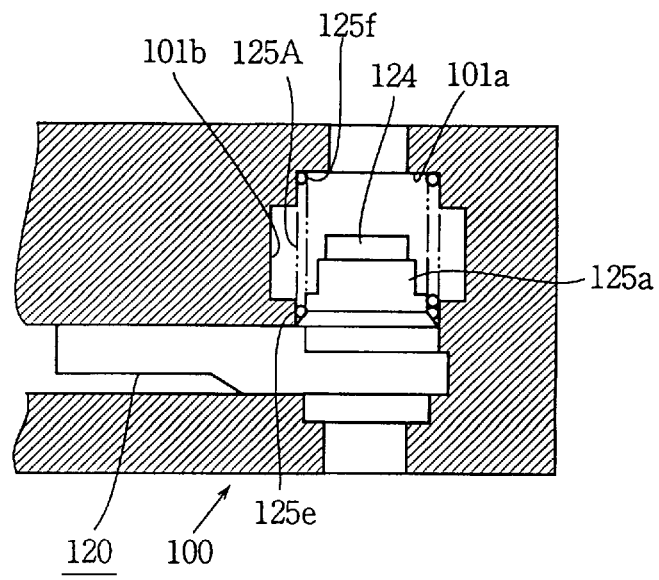
FIG. 11 is a cross sectional view showing how a coil-like spring is used to support a grating holder.

In this manner, as shown in FIG. 11, the middle portion of the coil-like spring 125A will not get contact with the holding member 125a. Thus, even if the coil-like spring 125A is deformed to some extent due to an upward force produced by the adjusting screw 127, the deformation of the coil-like spring 125A will not cause the grating holder 120 to incline, thereby avoiding a deviation of optical axis. In addition, since the middle portion of the coil-like spring 125A does not get contact with the grating holder 120, it becomes possible for the grating holder 120 to avoid a resonant phenomenon caused due to an outside vibration. Further, as shown in FIG. 11, if an annular space 101*b* for the coil-like spring 125A to escape is formed in the main pickup body 100, even better effect will be obtained.

Figure 12:
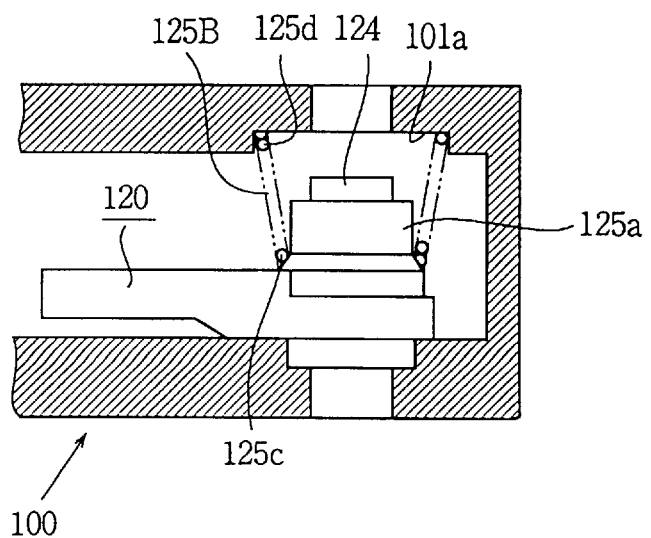
FIG. 12 is a cross sectional view showing how a coil-like spring is used to support a grating holder.

Moreover, as shown in FIG. 12, a coil-like tapered spring 125B may be used in the optical pickup, with its larger diameter portion 125*d* held at an annular recess 101*a* formed in the main pickup body 100, and its smaller diameter portion 125*c* engaged on the grating holder 120.

In an embodiment shown in FIG. 12, the grating holder 120 is urged by the coil-like spring 125B towards the laser diode 110. Thus, effected by the coil-like spring 125B, the grating holder 120 receives not only an urging force to push the grating holder 120 towards the laser diode 110, but also an urging force to cause the grating holder 120 to turn about the optical axis of the grating element 124. At this time, even if the coil-like spring 125 is deformed to some extent due to an upward force produced by the adjusting screw 127, since only the smaller diameter portion 125*c* of the coil-like tapered spring 125B will engage on the grating holder 120, the deformation of the coil-like spring 125B will not cause the grating holder 120 to incline, thereby avoiding a deviation of optical axis. In addition, since the coil-like spring 125B can exert a considerable pressing force on the grating holder 120, it becomes possible for the grating holder 120 to avoid a resonance phenomenon caused due to an outside vibration.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical pickup for use in an information reproducing apparatus for playing an optical disc, said optical pickup comprising:
   a main pickup body carrying an objective lens;
   a driven sub-pickup body connected with the main pickup body for causing the main pickup body to move in a radial direction with respect to the optical disc;
   a connecting structure formed in integral connection with the main pickup body for connecting the main pickup body to the driven sub-pickup body;
   wherein a groove having a predetermined size is formed in a joining portion located between the main pickup body and the connecting structure, thereby allowing a thickness of the joining portion to be made thinner, thus reducing a resonance phenomenon between the main pickup body and the driven sub-pickup body by reducing a vibration transmitting between the main pickup and driven sub-pickup bodies.

2. An optical pickup for use in an information reproducing apparatus for playing an optical disc, said optical pickup comprising:
   a driven sub-pickup body having a support member and a screw hole formed in the support member;
   a main pickup body carrying an objective lens and being adjustably pivotable with respect to the driven sub-pickup body, the main pickup body being movable in response to the driven sub-pickup body;
   a connecting structure having a screw hole and being formed in integral connection with the main pickup body;
   a joining portion located between the main pickup body and the connecting structure, and being formed with a groove having a predetermined size; and
   a screw which is engaged in the screw hole of the support member and the screw hole of the connecting structure, and which connects the connecting structure to the support member so that the main pickup body is adjustably pivotable.

3. An optical pickup for use in an information reproducing apparatus for playing an optical disc, the optical pickup comprising:
   an optical system carriage for carrying an optical system including an objective lens;
   a first guide member connecting means provided on a first side of the optical system carriage for connecting the optical system carriage to a first guide member disposed on the first side of the optical system carriage; and
   a second guide member connecting means provided on a second side of the optical system carriage, opposite the first side, for connecting the optical system carriage to a second guide member disposed on the second side of the optical system carriage, the first guide member connecting means having a mass greater than a mass of the second guide member connecting means;
   wherein a space having a predetermined size is formed between the optical system carriage and the first guide member connecting means, so that a thin thickness portion is formed between the optical system carriage and the first guide member connecting means, with the size of the space being sufficient to reduce a potential vibration transmitting between the optical system carriage and the first guide member connecting means so as to overcome a potential resonance phenomenon between the optical system carriage and the first guide member connecting means.

4. The optical pickup according to claim 3, wherein the first guide member connecting means is a driven guide member connecting means for causing the optical carriage to move in a radial direction relative to the optical disc and the second guide member connecting means is a passive guide member connecting means for passively guiding the optical carriage in the radial direction relative to the optical disc.

5. The optical pickup according to claim 4, wherein the optical system carriage is coupled to the first guide member connecting means by a screw, the screw being rotatable to a first position so that the optical system carriage is fixed to the first guide member connecting means, and the screw being rotatable to a second position so that the optical system carriage is pivotable about an axis radial to the disc.

6. The optical pickup according to claim 4, wherein the first and second guide member connecting means are integrally formed with the optical system carriage.

7. An optical pickup for use in an information reproducing apparatus for playing an optical disc, the optical pickup comprising:
   an optical system carriage for carrying an optical system including an objective lens;
   a driven guide member connecting means provided on a first side of the optical system carriage for connecting the optical system carriage to a first guide member disposed on the first side of the optical system carriage, and for moving the optical system carriage in a radial direction with respect to the optical disc; and
   a passive guide member connecting means provided on a second side of the optical system carriage, opposite the first side, for connecting the optical system carriage to a second guide member disposed on the second side of the optical system carriage;

wherein a space having a predetermined size is formed between the optical system carriage and the driven guide member connecting means, so that a thin thickness portion is formed between the optical system carriage and the driven guide member connecting means, with the size of the space being sufficient to reduce a potential vibration transmitting between the optical system carriage and the driven guide member connecting means so as to overcome a potential resonance phenomenon between the optical system carriage and the driven guide member connecting means.

8. The optical pickup according to claim 7, wherein the optical system carriage is coupled to the driven guide member connecting means by a screw, the screw being rotatable to a first position so that the optical system carriage is fixed to the driven guide member connecting means, and the screw being rotatable to a second position so that the optical system carriage is pivotable about an axis radial to the optical disc.

9. The optical pickup according to claim 7, wherein the driven and passive guide member connecting means are integrally formed with the optical system carriage.

10. An optical pickup for use in an information reproducing apparatus for playing an optical disc, said optical pickup comprising:

a main pickup body carrying an objective lens, the main pickup body including a connecting structure having a screw hole with a screw engaged therein, and the main pickup body having a groove of a predetermined size adjacent to the connecting structure; and a driven sub-pickup body for moving the main pickup body in a radial direction with respect to the optical disc and having a support member for connecting the connecting structure to the sub-pickup body, the support member having a screw hole with the screw engaged therein so that the connecting structure is adjustably pivotable with respect to the sub-pickup body.

* * * * *